(12) United States Patent
Mavlankar et al.

(10) Patent No.: US 12,382,118 B2
(45) Date of Patent: *Aug. 5, 2025

(54) STAGGERED KEY FRAME VIDEO ENCODING

(71) Applicant: NETFLIX, INC., Los Gatos, CA (US)

(72) Inventors: Aditya Mavlankar, San Francisco, CA (US); Ioannis Katsavounidis, San Jose, CA (US); Mark Watson, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,092

(22) Filed: Apr. 2, 2024

(65) Prior Publication Data

US 2024/0251116 A1 Jul. 25, 2024

Related U.S. Application Data

(63) Continuation of application No. 17/129,547, filed on Dec. 21, 2020, now Pat. No. 11,973,996, which is a (Continued)

(51) Int. Cl.
*H04N 21/2387* (2011.01)
*H04N 19/114* (2014.01)
(Continued)

(52) U.S. Cl.
CPC ....... *H04N 21/2387* (2013.01); *H04N 19/114* (2014.11); *H04N 19/172* (2014.11);
(Continued)

(58) Field of Classification Search
CPC ............ H04N 21/2387; H04N 19/114; H04N 19/172; H04N 21/233; H04N 21/234;
(Continued)

(56) References Cited

U.S. PATENT DOCUMENTS 8,321,905 B1 * 11/2012 Streeter ............ H04N 21/44004
725/89
8,863,182 B1 10/2014 Sharifi et al.
(Continued)

FOREIGN PATENT DOCUMENTS

CN 101212679 A 7/2008
CN 101729898 A 6/2010
(Continued)

OTHER PUBLICATIONS

"OpenCable(TM) Specifications Adaptive Transport Stream Specification", Feb. 14, 2014, Retrieved from the internet: URL: http://www.cablelabs.com/wp-content/uploads/specdocs/OC-SP-ATS-101-140214.pdf, 48 pages.

*Primary Examiner* — Timothy R Newlin
(74) *Attorney, Agent, or Firm* — Artegis Law Group, LLP

(57) ABSTRACT

One embodiment of the invention sets forth a mechanism for encoding video streams associated with the same digital content such that switch points staggered across two video streams occur at every offset temporal distance. The offset temporal distance is less than the distance between two consecutive key frames in a given video stream. This enables a content player to switch to a video stream having a playback quality up or down one level from a current video stream at the offset temporal distance from the most recently played key frame. In effect, the content player does not wait the entire key frame temporal distance before switching.

20 Claims, 6 Drawing Sheets

Related U.S. Application Data continuation of application No. 15/620,673, filed on Jun. 12, 2017, now Pat. No. 10,873,775.

(51) Int. Cl.
| | | |
|---|---|---|
| *H04N 19/172* | (2014.01) | |
| *H04N 21/233* | (2011.01) | |
| *H04N 21/234* | (2011.01) | |
| *H04N 21/2343* | (2011.01) | |
| *H04N 21/2365* | (2011.01) | |
| *H04N 21/262* | (2011.01) | |
| *H04N 21/438* | (2011.01) | |
| *H04N 21/845* | (2011.01) | |

(52) U.S. Cl.
CPC ......... *H04N 21/233* (2013.01); *H04N 21/234* (2013.01); *H04N 21/23439* (2013.01); *H04N 21/2365* (2013.01); *H04N 21/26275* (2013.01); *H04N 21/4383* (2013.01); *H04N 21/4384* (2013.01); *H04N 21/8456* (2013.01)

(58) Field of Classification Search
CPC ......... H04N 21/23439; H04N 21/2365; H04N 21/26275; H04N 21/4383; H04N 21/4384; H04N 21/8456
See application file for complete search history.

(56) References Cited

U.S. PATENT DOCUMENTS

| | | | |
|---|---|---|---|
| 2003/0076881 A1 | 4/2003 | Akiyoshi et al. | |
| 2010/0057928 A1 | 3/2010 | Kapoor et al. | |
| 2011/0262111 A1 | 10/2011 | Thornberry et al. | |
| 2011/0268178 A1* | 11/2011 | Park | H04N 21/238 375/240.02 |
| 2012/0114302 A1* | 5/2012 | Randall | H04N 9/87 386/E9.011 |
| 2012/0141089 A1 | 6/2012 | Hunt | |
| 2013/0051768 A1 | 2/2013 | Soroushian et al. | |
| 2013/0055326 A1 | 2/2013 | Lu et al. | |
| 2013/0246643 A1* | 9/2013 | Luby | H04L 65/762 709/231 |
| 2014/0078256 A1* | 3/2014 | Ogawa | H04N 13/161 348/43 |
| 2014/0269932 A1 | 9/2014 | Su et al. | |
| 2015/0229695 A1* | 8/2015 | Kim | H04L 65/70 709/219 |
| 2016/0352791 A1 | 12/2016 | Adams et al. | |
| 2017/0111672 A1 | 4/2017 | Ramamurthy et al. | |
| 2017/0134463 A1 | 5/2017 | Kim | |
| 2017/0272770 A1 | 9/2017 | Mukherjee et al. | |
| 2018/0041788 A1 | 2/2018 | Wang et al. | |
| 2018/0278976 A1 | 9/2018 | Mao et al. | |

FOREIGN PATENT DOCUMENTS

| | | |
|---|---|---|
| EP | 1796394 A2 | 6/2007 |
| KR | 10-2014-0056296 A | 5/2014 |

* cited by examiner

STAGGERED KEY FRAME VIDEO ENCODING

CROSS-REFERENCE TO RELATED APPLICATIONS

This application is a continuation of the co-pending U.S. patent application titled, "STAGGERED KEY FRAME VIDEO ENCODING," filed on Dec. 21, 2020 and having Ser. No. 17/129,547, which is a continuation of U.S. patent application titled, "STAGGERED KEY FRAME VIDEO ENCODING," filed on Jun. 12, 2017 and having Ser. No. 15/620,673, now U.S. Pat. No. 10,873,775. The subject matter of these related applications is hereby incorporated herein by reference.

BACKGROUND OF THE INVENTION

Field of the Invention

The present invention relates generally to digital media and, more specifically, to staggered key frame encoding

Description of the Related Art

Conventional digital content distribution systems usually include a content server, a content player, and a communications network connecting the content server to the content player. The content server is configured to store digital content files corresponding to different content titles that can be downloaded (either fully or partially) from the content server to the content player. Each digital content file is associated with a video stream encoded to a particular playback quality as well as an audio stream. As is well-understood, a video stream encoded to a high playback quality is larger in size than a video stream encoded to a lower playback quality.

The content player is configured to download and play a digital content file corresponding to a specific content title in response to a user selecting the content title for playback. Downloading the digital content file typically involves a technique known in the art as "streaming," whereby the content server sequentially transmits the digital content file corresponding to the selected content title to the content player. The content player then plays the video stream and the audio stream included in the digital content file as portions of those streams become available. Prior to initiating the download of the digital content file, the content player may measure available bandwidth from the content server and select a digital content file having a video stream encoded to a quality that can be supported by the measured available bandwidth. To the extent the communications network can provide adequate bandwidth to download the selected digital content file, while satisfying quality requirements, playback of the downloaded digital content file proceeds satisfactorily.

In practice, however, available bandwidth in the communications network constantly changes as different devices connected to the communications network perform independent tasks and factors constituting the environment of the communications network undergo change. For example, the communication channel for a mobile connection can undergo significant fluctuation. To maximize playback quality in the face of changing bandwidth availability, an adaptive streaming technique may be implemented. In adaptive streaming, if the available bandwidth in the communications network increases, then the content player downloads a different content file corresponding to the selected content title that includes a video stream encoded to a higher playback quality. Similarly, if the available bandwidth in the communications network decreases, then the content player may switch to downloading a different content file corresponding to the selected content title that includes a video stream encoded to a lower playback quality.

Switching from downloading a current video stream to downloading a new video stream should be seamless such that the first video frame played after the switch is the immediate successor of the last video frame played before the switch. Video frames in two different video streams are typically matched at switch points that correspond to key frame locations. In prior art techniques, the key frames within a video stream are located at equal temporal intervals and perfectly align with corresponding key frames within a different video stream of the same digital content.

FIG. 1 illustrates key frames aligned across different video streams according to prior art techniques. The video streams 102, 104, and 106 correspond to the same digital content encoded at different playback qualities. Each of the video streams 102-106 includes key frames, marked as "K" in the illustration. Each key frame K in the video streams 102-106 is located at a key frame temporal distance 108 from an immediately preceding key frame. In one embodiment, key frames are the only type of video frames that can be decoded independently of previous frames and thus playback can be initiated at a key frame. Each key frame K is followed by a given number of frames—these together make up a downloadable unit 116 that can be independently downloaded by a content player for playback.

Further, corresponding key frames across the video streams 102-106 are perfectly aligned at the temporal distances 108. Consequently, each switch point 110-114 is located at the key frame temporal distance 108 from an immediately preceding switch point. For example, switch point 112 is located at the key frame temporal distance 108 from switch point 110. A content player switching between video streams 102-106 can switch only at the switch points 110-114 and, therefore, can switch only after a playback length of at least the key frame temporal distance 108.

To increase the frequency of switch points between video streams and maintain the key frame alignment, the frequency of key frames within all of the video streams would have to be increased. Key frames, however, require between 5× to 40× more bits to encode at a certain quality relative to non-key frames. Therefore, increasing the frequency of key frames in the video streams increases the overall size of the video streams. Such an increase in the size of the video streams is undesirable because of the increased storage costs and the increased transmission times or communication bandwidth of the video streams to the content player.

SUMMARY OF THE INVENTION

One embodiment of the present invention sets forth a method that includes generating a first video stream for storing digital content encoded at a first playback quality, where the first video stream includes a plurality of key frames, each key frame in the plurality of key frames is associated with a different encoded sequence of the digital content, and a first key frame in the plurality of key frames is located within the first video stream at a first temporal distance from an immediately preceding key frame also included in the plurality of key frames. The method further includes generating a second video stream for storing the digital content encoded at a second playback quality, where the second video stream includes a plurality of staggered key frames, a second key frame in the plurality of staggered key frames is located within the second video stream at the first temporal distance from an immediately preceding key frame also included in the plurality of staggered key frames at an offset distance from where the first key frame is located within the first video stream. The second key frame includes a first switch point for switching download of the digital content from the first video stream to the second video stream or from the second video stream to the first video stream One advantage of the disclosed method is that a content player can frequently switch to a video stream having a playback quality up or down one level from a current video stream at the offset temporal distance from the most recently played key frame. In effect, the content player does not have to wait the entire key frame temporal distance before switching. Thus, this mechanism for configuring video streams increases the frequency of switch points between the video streams without increasing the frequency of key frames within the video streams.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
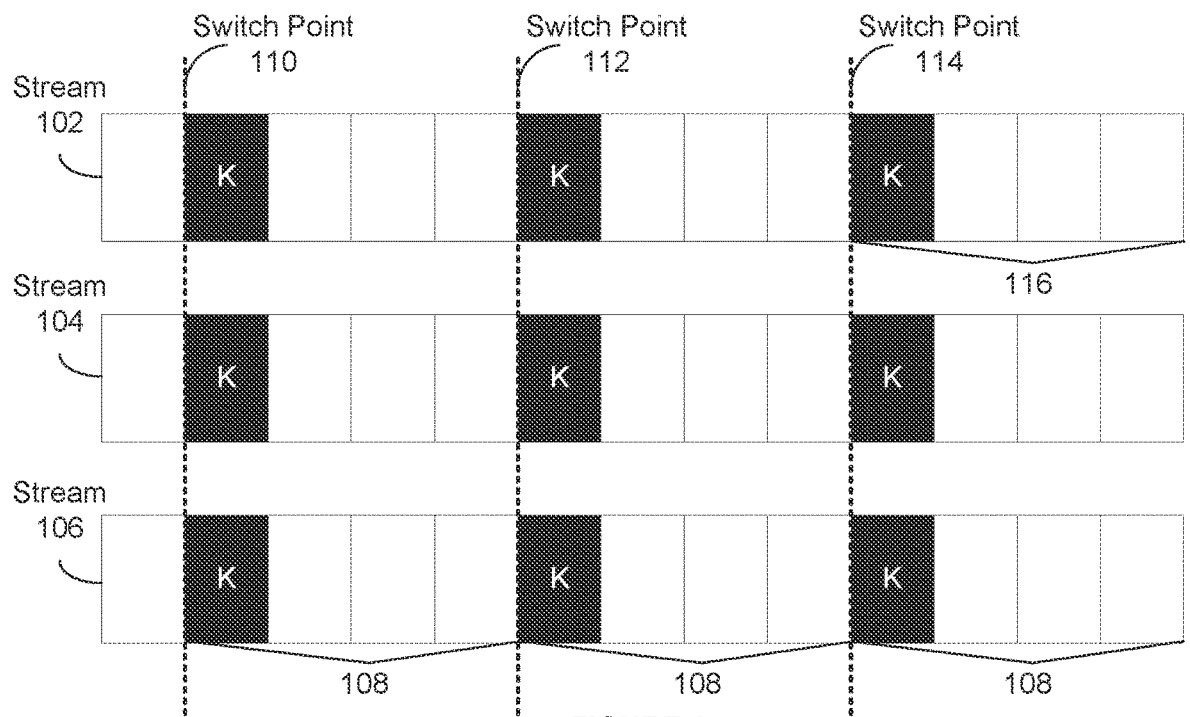
FIG. 1 illustrates key frames aligned across different video streams according to prior art techniques.
Figure 2:
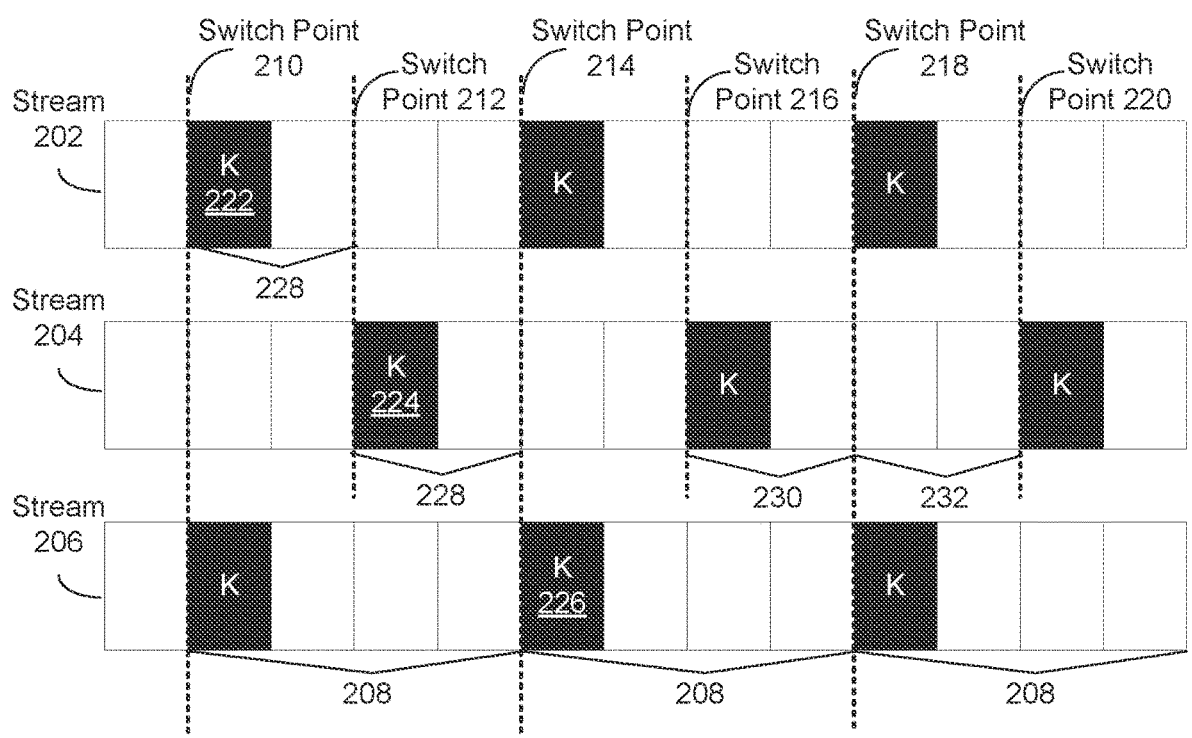
FIG. 2 illustrates key frames located at staggered offsets across different video streams, according to one embodiment of the invention.

FIG. 2 illustrates key frames located at staggered offsets across different video streams, according to one embodiment of the invention. The video streams 202, 204, and 206 correspond to the same digital content encoded at different playback quality. Video stream 204 has a quality one level below video stream 202 and one level above video stream 206. Each of the video streams 202-206 includes key frames, marked as "K" in the illustration. Each key frame K in a given video stream 202, 204, or 206 is located at a key frame temporal distance 208 from an immediately preceding key frame in the same video stream. Further, each key frame K in a given video stream 202, 204, or 206 is located at an offset temporal distance 228 from an immediately preceding key frame in a different video stream having a quality up or down one level from the given video stream. For example, key frame 224 in the video stream 204 is located at an offset temporal distance 228 from key frame 222 in the video stream 202. Similarly, key frame 226 in the video stream 206 is located at the offset temporal distance 228 from key frame 224 in the video stream 204. Each key frame K is followed by a given number of frames—these together make up a downloadable unit 230 that can be independently downloaded by a content player for playback. Each downloadable unit including a key frame K is followed by another downloadable unit that does not include a key frame and can also be independently downloaded by a content player for playback. For example, downloadable unit 232 without a key frame follows downloadable unit 230 that includes a key frame.

The offset temporal distance 228 is less than the temporal distance 208. In one embodiment, the offset temporal distance 228 is half of the temporal distance 208. As a result, switch points 210-220 corresponding to the key frames staggered across the video streams 202-206 occur at every offset temporal distance 228. This enables a content player to switch to downloading video stream having a quality up or down one level from a current video stream at the offset temporal distance 228 from the most recently played key frame. In effect, the content player does not have to wait the entire key frame temporal distance 208 before switching. Thus, this mechanism for configuring video streams increases the frequency of switch points between the video streams without increasing the frequency of key frames within the video streams. In one embodiment, the content player may switch to a video stream having a quality up two levels from a current video stream if a switch point is unavailable within the video stream having a quality up one level. Similarly, the content player may switch to a video stream having a quality down two levels from a current video stream if a switch point is unavailable within the video stream having a quality down one level.

Figure 3:
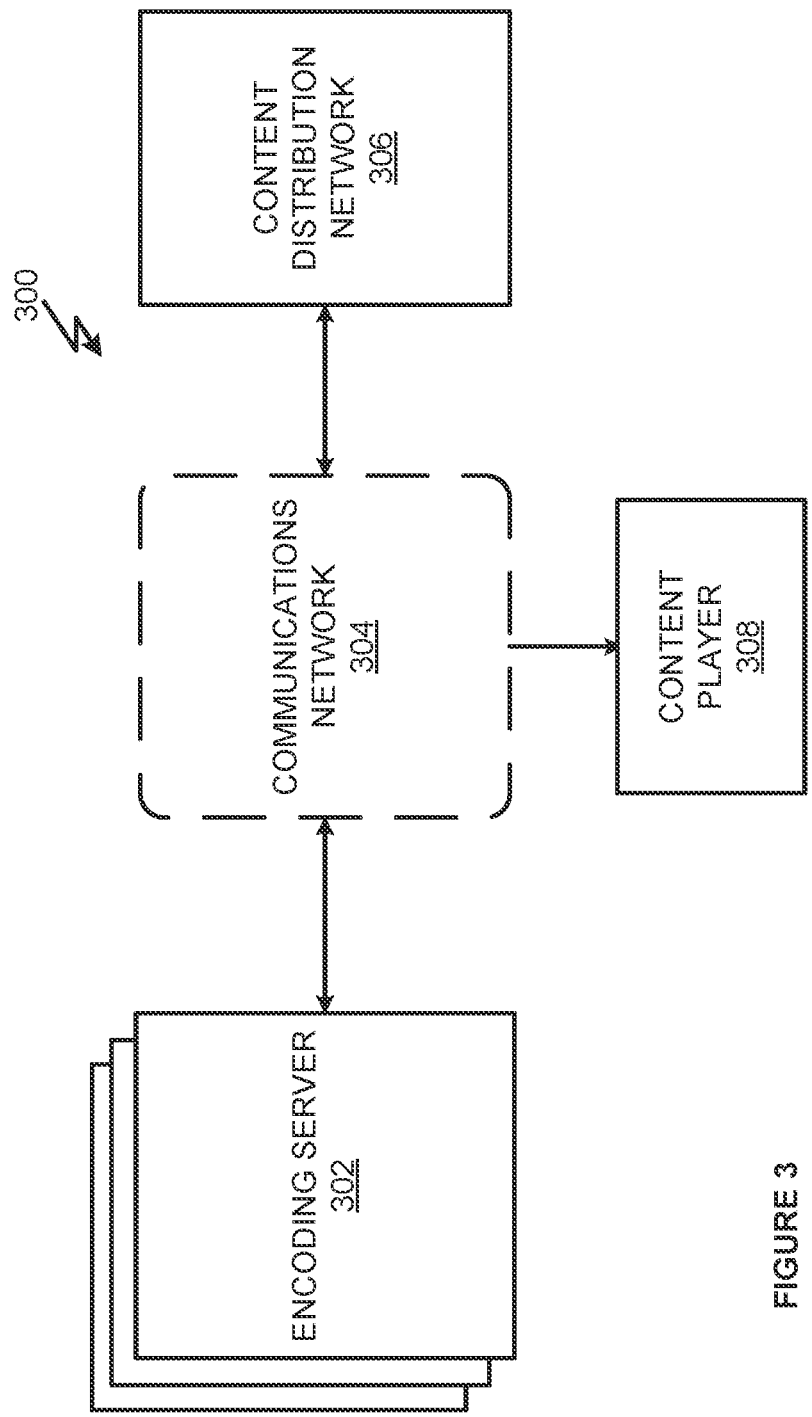
FIG. 3 illustrates a content distribution system configured to implement one or more aspects of the invention.

FIG. 3 illustrates a content distribution system 300 configured to implement one or more aspects of the invention. As shown, the content distribution system 300 includes an encoding server 302, a communications network 304, a content distribution network (CDN) 306 and a content player 308.

The communications network 304 includes a plurality of network communications systems, such as routers and switches, configured to facilitate data communication between the encoding server 302, the CDN 306 and the content player 308. Persons skilled in the art will recognize that many technically feasible techniques exist for building the communications network 304, including technologies practiced in deploying the well-known internet communications network.

The encoding server 302 is a computer system configured to encode video streams associated with digital content files for adaptive streaming. The encoding workflow for encoding the video streams for adaptive streaming is described in greater detail below with respect to FIGS. 4-7. The content distribution system 300 may include one or more encoding servers 302, where each encoding server 302 is configured to perform all the functions needed to encode the video streams or where each encoding server 302 is configured to perform a particular function needed to encode the video streams. The digital content files including the encoded video streams are retrieved by the CDN 306 via the communications network 304 for distribution to the content player 308.

The CDN 306 comprises one or more computer systems configured to serve download requests for digital content files from the content player 308. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the content server 106 to the content player 308.

The content player 308 may comprise a computer system, a set top box, a mobile device such as a mobile phone, or any other technically feasible computing platform that has network connectivity and is coupled to or includes a display device and speaker device for presenting video frames, and generating acoustic output, respectively. The content player 308 is configured for adaptive streaming, i.e., to download segments of a video stream encoded to a specific playback quality, and switch to downloading subsequent segments of a video stream encoded to a different playback quality based on prevailing bandwidth conditions within the communications network 304. A segment is the smallest unit of the video stream that can be downloaded independently. As available bandwidth within the communications network 304 becomes limited, the content player 308 may select a video stream encoded to a lower playback quality. As available bandwidth increases, a video stream encoded to a higher playback quality may be selected.

Although, in the above description, the content distribution system 300 is shown with one content player 308 and one CDNs 306, persons skilled in the art will recognize that the architecture of FIG. 3 contemplates only an exemplary embodiment of the invention. Other embodiments may include any number of content players 308 and/or CDNs 306. Thus, FIG. 3 is in no way intended to limit the scope of the present invention in any way.

Figure 4:
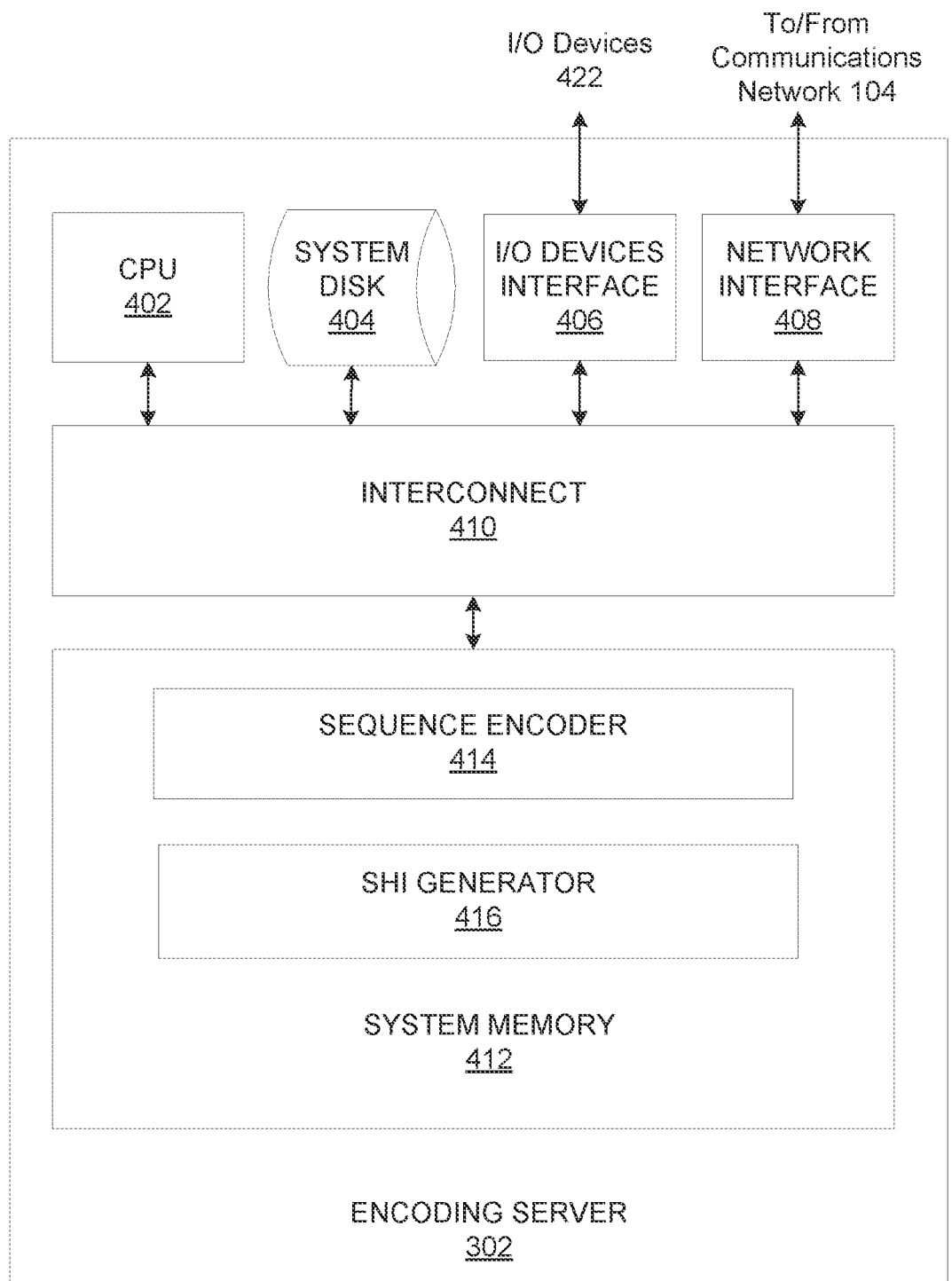
FIG. 4 is a more detailed illustration of the encoding server of FIG. 3, according to one embodiment of the invention.

FIG. 4 is a more detailed illustration of the encoding server 302 of FIG. 3, according to one embodiment of the invention. As shown, the encoding server 302 includes a central processing unit (CPU) 402, a system disk 404, an input/output (I/O) devices interface 406, a network interface 408, an interconnect 410 and a system memory 412.

The CPU 402 is configured to retrieve and execute programming instructions stored in the system memory 412. Similarly, the CPU 402 is configured to store application data and retrieve application data from the system memory 412. The interconnect 410 is configured to facilitate transmission of data, such as programming instructions and application data, between the CPU 402, the system disk 404, I/O devices interface 406, the network interface 408, and the system memory 412. The I/O devices interface 406 is configured to receive input data from I/O devices 422 and transmit the input data to the CPU 402 via the interconnect 410. For example, I/O devices 422 may comprise one or more buttons, a keyboard, and a mouse or other pointing device. The I/O devices interface 406 is also configured to receive output data from the CPU 402 via the interconnect 410 and transmit the output data to the I/O devices 422. The system disk 404, such as a hard disk drive or flash memory storage drive or the like, is configured to store non-volatile data such as encoded video streams. The encoded video streams can then be retrieved by the CDN 306 via the communications network 304. The network interface 408 is coupled to the CPU 402 via the interconnect 410 and is configured to transmit and receive packets of data via the communications network 304. In one embodiment, the network interface 408 is configured to operate in compliance with the well-known Ethernet standard.

The system memory 412 includes software components that include instructions for encoding one or more video streams associated with a specific content title for adaptive streaming. As shown, these software components include a sequence encoder 414 and a sequence header index (SHI) generator 416.

The sequence encoder 414 executes encoding operations for generating a video stream encoded at a specific playback b or visual quality such that the encoded video stream is configured for adaptive streaming. In one embodiment, the video stream is encoded to attain a certain visual quality, where the bitrates at which different segments of the video stream may vary. In different embodiments, the video stream can be encoded to comply with different video codec standards, such as VC1, MPEG, or H.264. An encoded video stream generated by the sequence encoder 414 includes a series of encoded sequences. Each encoded sequence comprises one segment including one key frame and one or more non-key frames (referred to herein as "data frames") and another segment including only data frames. In one embodiment, the encoded sequences represent different portions of the content title.

The temporal distance between key frames in two consecutive encoded sequences in a given video stream is referred to herein as the "key frame temporal distance." For two video streams associated with the same content title and encoded at two consecutive playback qualities, the sequence encoder 414 staggers key frames across the video streams by an offset distance. In operation, for a given video stream A, the sequence encoder 414 places key frames at regular intervals having a length equivalent to the key frame temporal distance. The location of a given key frame is offset relative to an immediately preceding key frame in a video stream B having a playback quality up or down one level from the video stream A. The length of the offset (referred to herein as the "offset distance") is less than the key frame temporal distance. In one embodiment, the offset distance is half of the key frame temporal distance.

Figure 5:
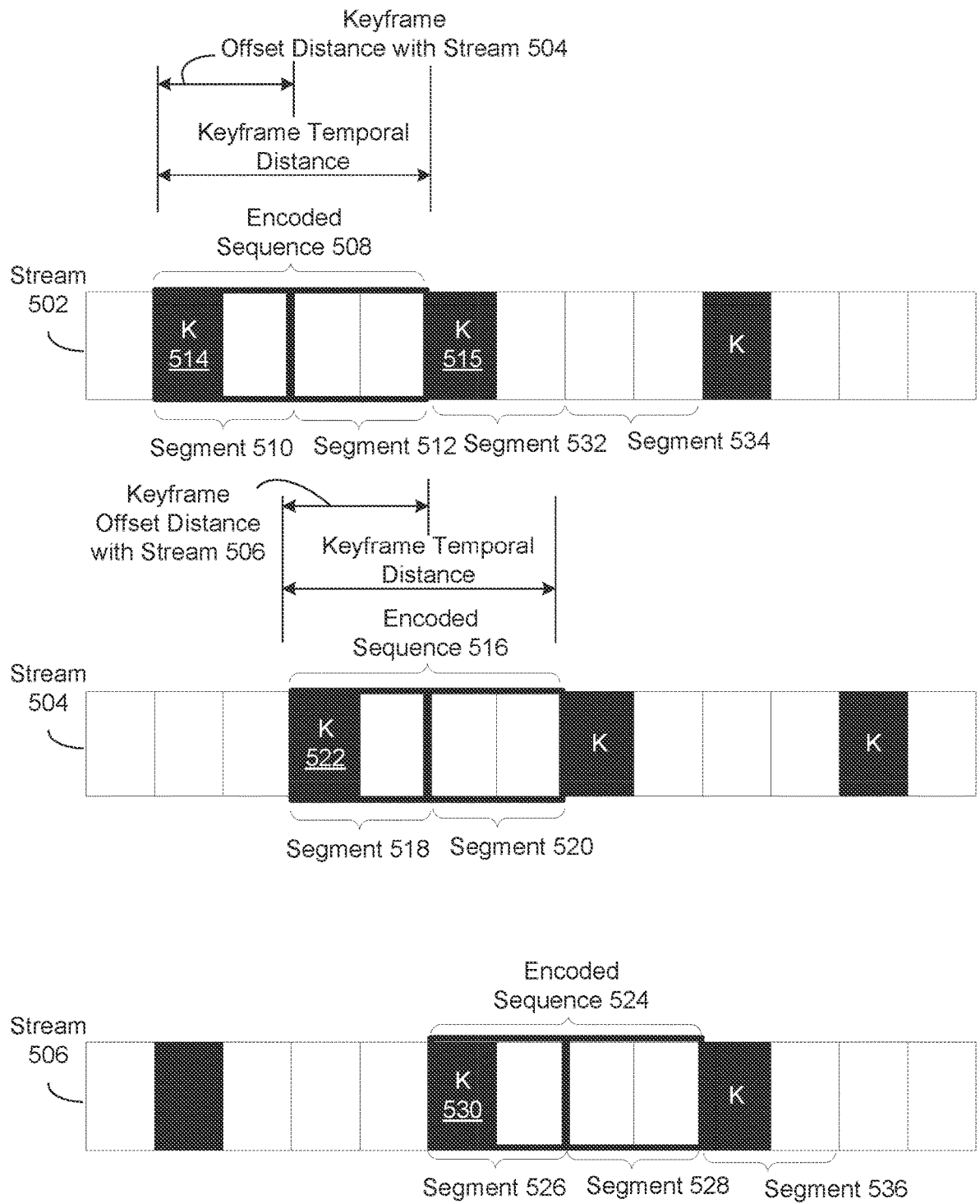
FIG. 5 illustrates multiple video streams associated with the same digital content and processed by the encoding server of FIG. 4, according to one embodiment of the invention.

FIG. 5 illustrates exemplary video streams 502, 504, and 506 processed by the sequence encoder 414, according to one embodiment of the invention. In the illustrated example, video stream 504 is associated with a given playback quality A, video stream 502 is associated with a playback quality up one level from the quality A, i.e., A+1, and video stream 506 is associated with a playback quality down one level from the quality A, i.e., A−1. Quality A, A+1, and A−1 are only labels denoting higher and lower level quality and are not limited to the actual bitrate or quality values. Each of the streams 502, 504, and 506 includes a plurality of encoded sequences, such as the encoded sequence 508 in stream 502, the encoded sequence 516 in stream 504, and the encoded sequence 524 in stream 506.

Each encoded sequence includes two segments—one segment includes a key frame associated with the segment and another data frame and the second segment includes two data frames. For example, segment 510 in the encoded sequence 508 includes the key frame 514 and one data frame, and segment 512 in the encoded sequence 508 includes two data frames. Similarly, segment 518 in the encoded sequence 516 includes the key frame 522 and one data frame, and segment 520 in the encoded sequence 516 includes two data frames. Further, segment 526 in the encoded sequence 524 includes the key frame 530 and one data frame, and segment 528 in the encoded sequence 524 includes two data frames. The key frame temporal distance between key frames of two consecutive encoded sequences is the same across the video streams 502, 504, and 506. In the illustrated example, the key frame temporal distance is equal to the playback length of four frames, i.e., a key frame and three data frames. Each of the key frames in a given video stream operates as a switching point such that downloading (and, thus, playback) can be switched from a different video stream to the given video stream.

For the video streams 502 and 504 associated with playback qualities one level up/down from one another, the sequence encoder 414 staggers the key frames across the video streams 502 and 504 by an offset distance. Consequently, the key frame 522 starts at the offset distance from the key frame 514 in the encoded sequence 508. The location of the start of key frame 522 corresponds to the location of the start of segment 512 in the encoded sequence 508. For the video streams 504 and 506 associated with playback qualities one level up/down from one another, the sequence encoder 414 staggers the key frames across the video streams 504 and 506 by the same offset distance. Consequently, the key frame 530 starts at the offset distance from the key frame 522 in the encoded sequence 516. The location of the start of key frame 530 corresponds to the location of the start of segment 520 in the encoded sequence 516.

Returning to FIG. 4, the SHI generator 416 generates a sequence header index associated with each encoded video stream. The sequence header associated with an encoded video stream separately identifies each segment of the encoded sequences in the encoded video stream and specifies download offsets for the segments. In one embodiment, the sequence header also specifies whether a given segment includes a key frame and thus can operate as a "to" switching point. In one embodiment, while a "to" switching point has a key frame, the "from" switching point need not have an immediately succeeding key frame in the corresponding stream. The "from" switching point may be the end of a segment.

Based on the sequence header indices associated with two encoded video streams of the same content title, the content player 308 can switch between the encoded video streams by identifying the appropriate switch points in the sequence header indices. When switching between a currently playing encoded video stream and a new encoded video stream, the content player 308 identifies a next segment to be downloaded and locates the offset of the next segment in the sequence header index of the new encoded stream. The content player 308 only downloads the next segment from the new encoded stream when the segment includes a key frame (and, therefore, is a valid switch point).

Using the video streams 502, 504, and 506 in FIG. 5 as an example, assume a scenario where the content player 308 has downloaded segment 518 and decides to switch to the higher quality video stream 502. The content player 308 processes the sequence header associated with video stream 502 to determine that the key frame 515 is a valid switching point to switch to video stream 502. The content player 308, therefore, finishes playing segment 518 and downloads segment 532 for playback.

Continuing the scenario, the content player 308 downloads segment 534 for playback and decides to switch to the lower quality video stream. Upon evaluating the sequence header index, the content player 308 determines that a switch point is not available in stream 504 for switching to a next segment to be played. In one embodiment, the content player 308 downloads the next segment 536 from stream 506, having a quality two levels below the stream 502, since a switch point is available within the stream 506. In an alternate embodiment, the content player 308 continues to download the next segment from stream 502 and then switches to stream 504 at the next available switch point.

Figure 6:
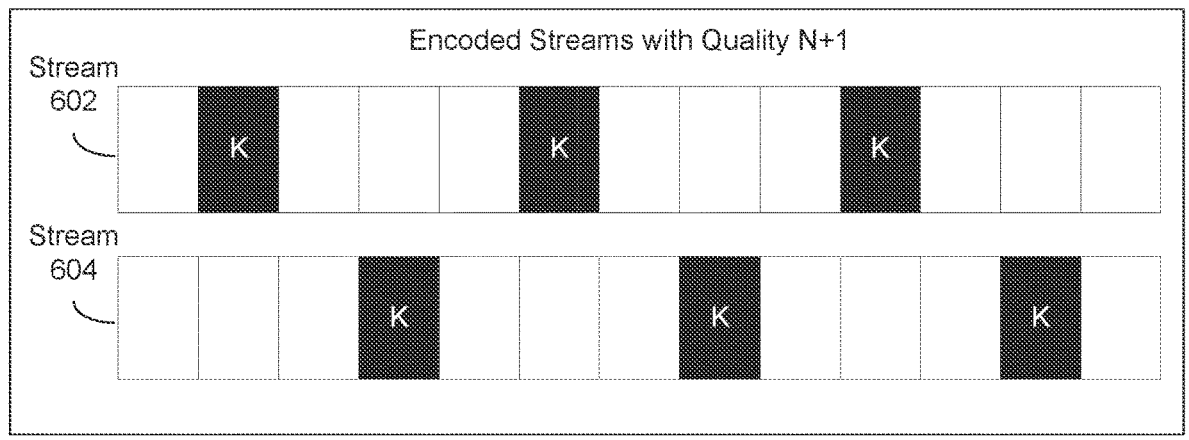
FIG. 6 illustrates multiple groups of video streams associated with the same digital content and processed by the encoding server of FIG. 4, according to one embodiment of the invention.
Figure 6:
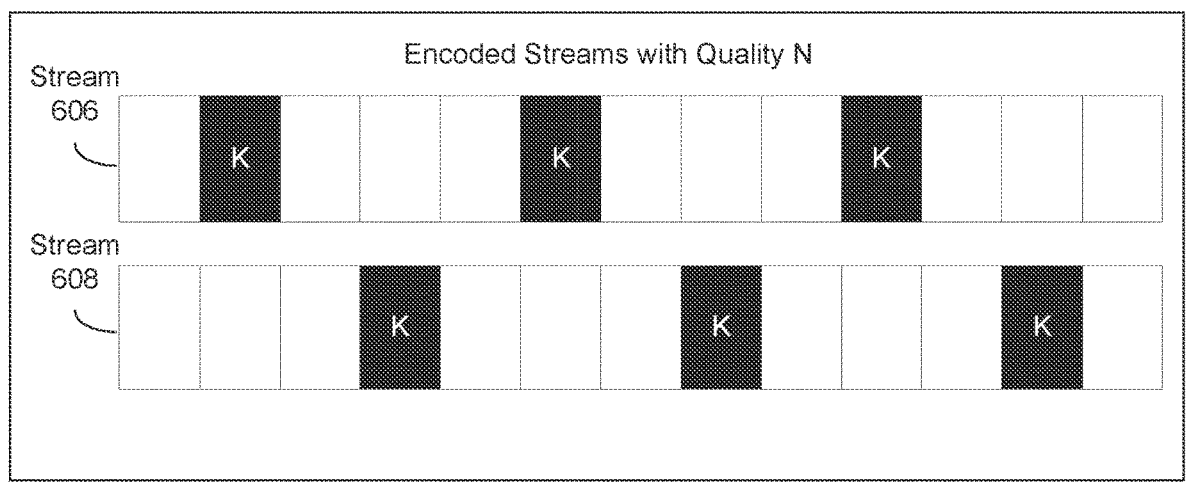
Figure 6:
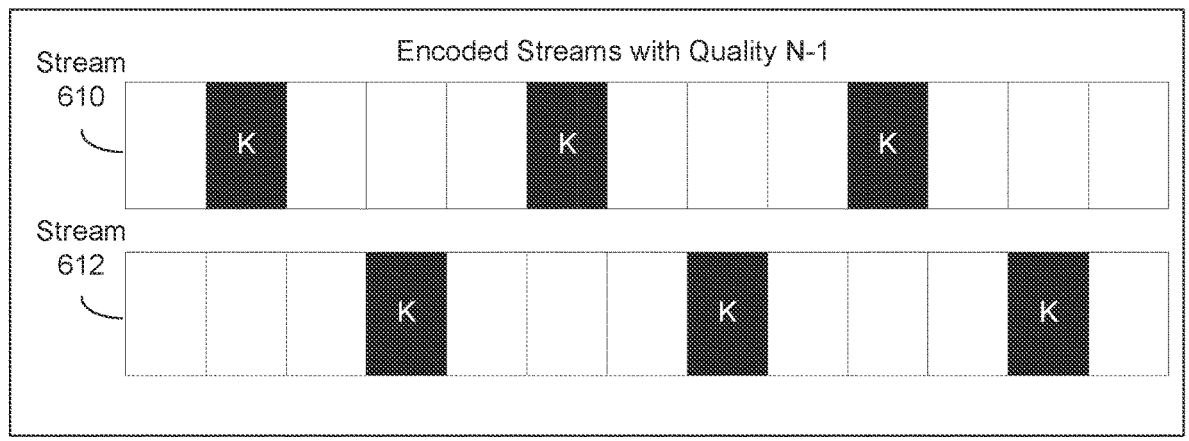

In one embodiment, the sequence encoder 414 generates multiple video streams encoded at a specific playback quality. These video streams include key frames that are staggered by an offset distance much like the staggering shown in FIG. 5. FIG. 6 illustrates multiple groups of video streams associated with the same digital content and processed by the sequence encoder 414, according to one embodiment of the invention. As shown, the video streams 602 and 604 are associated with the same playback quality and have key frames staggered from one another at an offset distance. Similarly, video streams 606 and 608 are associated with the same playback quality and have key frames staggered from one another at the offset distance. Further, video streams 610 and 612 are associated with the same playback quality and have key frames staggered from one another at an offset distance.

With multiple video streams encoded at a specific playback quality and having staggered key frames (and thus switch points), the content player 308 can selectively switch to the video stream having a switch point corresponding to the next segment to be downloaded. Thus, the scenario described above where the content player 308 has to wait or switch to a lower or higher quality than desired occurs less frequently or is avoided altogether. In one embodiment, since having multiple encoded video streams increases the storage footprint for the video streams, the sequence encoder 114 generates multiple encoded video streams for playback qualities that are most likely used by one or more content players during playback.

In one embodiment, the sequence encoder 414 generates multiple video streams encoded at a specific playback quality having different key frame distances. For example, a first encoded video stream having a given quality may have a key frame distance of B and a second encoded video stream having the given quality may have a key frame distance of a multiple of B, e.g., three times B. An encoded video stream having a longer key frame distance reduces the opportunities to switch to that encoded video stream since the key frames occur infrequently. Opportunities for switching from such a stream would depend on the key frames in the stream to which the switch occurs, as described above. In one embodiment, a content player downloading digital content from a video stream encoded with longer key frame distances would not switch from such a stream unless download conditions change dramatically.

Figure 7:
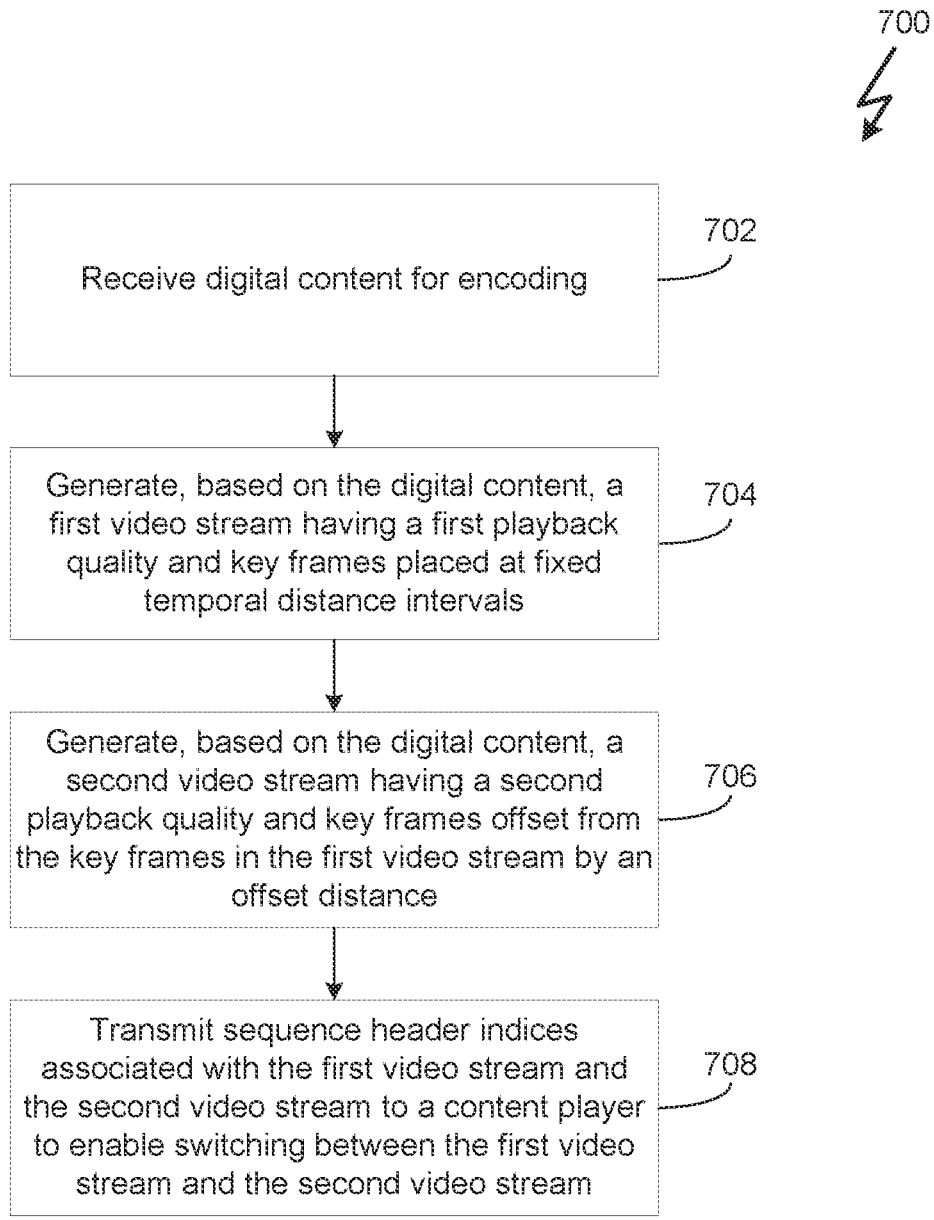
FIG. 7 is a flow diagram of method steps for encoding video streams associated with digital content, according to another embodiment of the invention.

FIG. 7 is a flow diagram of method steps for encoding a video stream for adaptive video streaming, according to one embodiment of the invention. Although the method steps are described in conjunction with the systems for FIGS. 1-6, persons skilled in the art will understand that any system configured to perform the method steps, in any order, is within the scope of the invention.

The method 700 begins at step 702 where the sequence encoder 414 receives digital content for encoding. At step 704, the sequence encoder 414 generates, based on the digital content, a first video stream encoded at a first quality and including a plurality of key frames located at fixed distance intervals. Each key frame is located within the first video stream at a key frame temporal distance from an immediately preceding key frame.

At step 706, the sequence encoder 414 generates, based on the digital content, a second video stream encoded at a second quality and including a plurality of key frames located at fixed temporal distance intervals and offset from the immediately preceding key frames in the first video stream by an offset distance. As with the first video stream, each key frame in the second video stream is located within the first video stream at a key frame temporal distance from an immediately preceding key frame in the second video stream. The location of a given key frame is an offset distance from an immediately preceding key frame in the first video stream. The offset distance is less than the key frame temporal distance. In one embodiment, the offset distance is half of the key frame temporal distance.

At step 708, the sequence encoder 414 transmits sequence header indices identifying the key frame locations within the first video stream and the second video stream to a content player to enable switching between the first video stream and the second video stream. The content player can switch between the first video stream and the second video stream after a playback interval equivalent to the offset distance.

In sum, switch points in different video streams encoded at different playback qualities are staggered across the video streams and occur at every offset temporal distance. This enables a content player to switch to a video stream having a quality up or down one level from a current video stream at the offset temporal distance from the most recently played key frame. In effect, the content player does not have to wait the entire key frame temporal distance before switching. Thus, this mechanism for configuring video streams increases the frequency of switch points between the video streams without increasing the frequency of key frames within the video streams.

1. In some embodiments, a method comprises generating a first video stream for storing digital content encoded at a first playback quality, wherein the first video stream includes a plurality of key frames, each key frame in the plurality of key frames is associated with a different encoded sequence of the digital content, and a first key frame in the plurality of key frames is located within the first video stream at a first temporal distance from an immediately preceding key frame also included in the plurality of key frames; and generating a second video stream for storing the digital content encoded at a second playback quality, wherein the second video stream includes a plurality of staggered key frames, a second key frame in the plurality of staggered key frames is located within the second video stream at the first temporal distance from an immediately preceding key frame also included in the plurality of staggered key frames at an offset distance from where the first key frame is located within the first video stream, wherein the second key frame comprises a first switch point for switching download of the digital content from the first video stream to the second video stream or from the second video stream to the first video stream.

2. The method of clause 1, wherein the first key frame is associated with first encoded sequence, and download of the digital content is switched from the first video stream to the second video stream after a segment of the first encoded sequence has been played, and wherein the offset distance comprises half of the first temporal distance, and a length of the segment is half of the first temporal distance.

3. The method of clauses 1 or 2, further comprising generating a third video stream for storing the digital content encoded at a third playback quality, wherein the third video stream includes a second plurality of staggered key frames, wherein a third key frame in the second plurality of staggered key frames is located within the second video stream at the first temporal distance from an immediately preceding key frame also included in the second plurality of staggered key frames at the first temporal distance from where the first key frame is located within the first video stream.

4. The method of clauses 1-3, wherein the third key frame comprises a second switch point for switching download of the digital content from the first video stream to the third video stream at the third key frame after the first encoded sequence has been played.

5. The method of clause 1-4, wherein the first playback quality is higher than the second playback quality, and wherein the second playback quality is higher than the third playback quality.

6. The method of clauses 1-5, further comprising generating a third video stream for storing the digital content encoded at the second playback quality, wherein the second video stream includes a second plurality of staggered key frames, wherein a third key frame in the second plurality of staggered key frames is located within the second video stream at the first temporal distance from an immediately preceding key frame also included in the second plurality of staggered key frames at the first temporal distance from where the first key frame is located within the first video stream.

7. The method of clauses 1-6, wherein the third key frame comprises a second switch point for switching download of the digital content from the first video stream to the third video stream at the third key frame after the first encoded sequence has been played.

8. The method of clauses 1-7, further comprising generating a third video stream for storing the digital content encoded at the second playback quality, wherein the second video stream includes a second plurality of staggered key frames, wherein a third key frame in the second plurality of staggered key frames is located within the second video stream at the first temporal distance from an immediately preceding key frame also included in the second plurality of staggered key frames at a multiplier first temporal distance from where the first key frame is located within the first video stream.

9. The method of clauses 1-8, further comprising, when switching from the first video stream to the second video stream, determining that a next segment of the first encoded sequence to be played directly following the segment is associated with the second key frame.

10. The method of clauses 1-9, further comprising causing the download of the digital content to switch from the first video stream to the second video stream only when the second key frame can be downloaded from the second video stream prior to downloading a second segment of encoded data associated with the second key frame and corresponding to the next segment.

11. The method of clauses 1-10, wherein the first video stream includes a plurality of downloadable units that are each individually downloaded for playback, and wherein a first downloadable unit in the plurality of downloadable units includes the first key frame and a second downloadable unit in the plurality of downloadable units includes content frames associated with the first key frame.

12. In some embodiments, a computer readable medium storing instructions that, when executed by a processor, cause the processor to generate a first video stream for storing digital content encoded at a first playback quality, wherein the first video stream includes a plurality of key frames, each key frame in the plurality of key frames is associated with a different encoded sequence of the digital content, and a first key frame in the plurality of key frames is located within the first video stream at a first temporal distance from an immediately preceding key frame also included in the plurality of key frames; and generate a second video stream for storing the digital content encoded at a second playback quality, wherein the second video stream includes a plurality of staggered key frames, a second key frame in the plurality of staggered key frames is located within the second video stream at the first temporal distance from an immediately preceding key frame also included in the plurality of staggered key frames at an offset distance from where the first key frame is located within the first video stream, wherein the second key frame comprises a first switch point for switching download of the digital content from the first video stream to the second video stream or from the second video stream to the first video stream.

13. The computer readable medium of clause 12, wherein the first key frame is associated with first encoded sequence, and download the digital content is switched from the first video stream to the second video stream after a segment of the first encoded sequence has been played, and wherein the offset distance comprises half of the first temporal distance, and a length of the segment is half of the first temporal distance.

14. The computer readable medium of clauses 12-13, wherein the instructions further cause the processor to generate a third video stream for storing the digital content encoded at a third playback quality, wherein the third video stream includes a second plurality of staggered key frames, wherein a third key frame in the second plurality of staggered key frames is located within the second video stream at the first temporal distance from an immediately preceding key frame also included in the second plurality of staggered key frames at the first temporal distance from where the first key frame is located within the first video stream.

15. The computer readable medium of clauses 12-14, wherein the third key frame comprises a second switch point for switching the download of the digital content from the first video stream to the third video stream at the third key frame after the first encoded sequence has been played.

16. The computer readable medium of clauses 12-15, wherein the first playback quality is higher than the second playback quality, and wherein the second playback quality is higher than the third playback quality.

17. The computer readable medium of clauses 12-16, wherein the instructions further cause the processor to generate a third video stream for storing the digital content encoded at the second playback quality, wherein the second video stream includes a second plurality of staggered key frames, wherein a third key frame in the second plurality of staggered key frames is located within the second video stream at the first temporal distance from an immediately preceding key frame also included in the second plurality of staggered key frames at the first temporal distance from where the first key frame is located within the first video stream.

18. The computer readable medium of clauses 12-17, wherein the third key frame comprises a second switch point for switching the download of the digital content from the first video stream to the third video stream at the third key frame after the first encoded sequence has been played.

19. The computer readable medium of clauses 12-18, wherein the instructions further cause the processor to generate a third video stream for storing the digital content encoded at the second playback quality, wherein the second video stream includes a second plurality of staggered key frames, wherein a third key frame in the second plurality of staggered key frames is located within the second video stream at the first temporal distance from an immediately preceding key frame also included in the second plurality of staggered key frames at a multiplier first temporal distance from where the first key frame is located within the first video stream.

20. The computer readable medium of clauses 12-19, wherein the instructions further cause the processor to determine, when switching from the first video stream to the second video stream, that a next segment of the first encoded sequence to be played directly following the segment is associated with the second key frame.

21. The computer readable medium of claim 12-20, wherein the instructions further cause the processor to cause the download of the digital content to switch from the first video stream to the second video stream only when the second key frame can be downloaded from the second video stream prior to downloading a second segment of encoded data associated with the second key frame and corresponding to the next segment.

22. The computer readable medium of clauses 12-21, wherein the first video stream includes a plurality of downloadable units that are each individually downloaded for playback, and wherein a first downloadable unit in the plurality of downloadable units includes the first key frame and a second downloadable unit in the plurality of downloadable units includes content frames associated with the first key frame.

23. In some embodiments, a computing environment comprises an encoding server that processes digital content to: generate a first video stream for storing digital content encoded at a first playback quality, wherein the first video stream includes a plurality of key frames, each key frame in the plurality of key frames is associated with a different encoded sequence of the digital content, and a first key frame in the plurality of key frames is located within the first video stream at a first temporal distance from an immediately preceding key frame also included in the plurality of key frames, and generate a second video stream for storing the digital content encoded at a second playback quality, wherein the second video stream includes a plurality of staggered key frames, a second key frame in the plurality of staggered key frames is located within the second video stream at the first temporal distance from an immediately preceding key frame also included in the plurality of staggered key frames at an offset distance from where the first key frame is located within the first video stream; and a content player that switches download of the digital content from the first video stream to the second video stream or from the second video stream to the first video stream at the second key frame.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
   retrieving a first sequence header associated with a first video stream storing digital content encoded at a first playback quality, wherein the first video stream comprises a first plurality of segments that include a first plurality of switch points;
   retrieving a second sequence header associated with a second video stream storing the digital content encoded at a second playback quality, wherein the second video stream comprises a second plurality of segments that include a second plurality of switch points; and
   distributing at least one of the first video stream or the second video stream to a content player,
      wherein the first video stream includes a first segment for playback identified by the first sequence header, wherein the first segment is included in the first plurality of segments and includes a first switch point that is positioned at a first temporal distance from an immediately subsequent switch point in the first video stream, and
      wherein the second video stream includes a second segment for playback identified by the second sequence header, wherein the second segment is included in the second plurality of segments and includes a second switch point that is positioned less than the first temporal distance from the first switch point and is positioned at the first temporal distance from an immediately subsequent switch point in the second video stream, wherein a next segment immediately subsequent to the second segment in the second plurality of segments does not include a switch point.

2. The computer-implemented method of claim 1, wherein the first switch point comprises a point in the playback of the first video stream where download of the digital content can be switched from the first video stream to the second video stream or from the second video stream to the first video stream.

3. The computer-implemented method of claim 1, wherein the second switch point comprises a point in the playback of the second video stream where download of the digital content can be switched from the second video stream to the first video stream or from the first video stream to the second video stream.

4. The computer-implemented method of claim 1, further comprising distributing the first segment from a content delivery system to the content player and, subsequently, distributing the second segment from the content delivery system to the content player.

5. The computer-implemented method of claim 1, further comprising retrieving a third sequence header associated with a third video stream storing the digital content encoded at a third playback quality, wherein the third video stream comprises a third plurality of segments that includes a third plurality of switch points.

6. The computer-implemented method of claim 5, wherein a third switch point included in the third plurality of switch points is positioned less than the first temporal distance from the second switch point and is positioned at the first temporal distance from the first switch point and an immediately subsequent switch point in the third video stream.

7. The computer-implemented method of claim 6, wherein the third video stream includes a third segment for playback identified by the third sequence header, wherein the third segment is included in the third plurality of segments and includes the third switch point, and wherein the third segment is played back subsequent to the second segment.

8. The computer-implemented method of claim 1, further comprising determining that the distributing of the at least one of the first video stream or the second video stream to the content player should be switched from the first video stream to the second video stream based on one or more parameters.

9. The computer-implemented method of claim 8, wherein a first parameter included in the one or more parameters comprises a change in network condition.

10. One or more non-transitory computer readable media storing instructions that, when executed by one or more processors, cause the one or more processors to perform the steps of:
retrieving a first sequence header associated with a first video stream storing digital content encoded at a first playback quality, wherein the first video stream comprises a first plurality of segments that include a first plurality of switch points;
retrieving a second sequence header associated with a second video stream storing the digital content encoded at a second playback quality, wherein the second video stream comprises a second plurality of segments that include a second plurality of switch points; and
distributing at least one of the first video stream or the second video stream to a content player,
wherein the first video stream includes a first segment for playback identified by the first sequence header, wherein the first segment is included in the first plurality of segments and includes a first switch point that is positioned at a first temporal distance from an immediately subsequent switch point in the first video stream, and
wherein the second video stream includes a second segment for playback identified by the second sequence header, wherein the second segment is included in the second plurality of segments and includes a second switch point that is positioned less than the first temporal distance from the first switch point and is positioned at the first temporal distance from an immediately subsequent switch point in the second video stream, wherein a next segment immediately subsequent to the second segment in the second plurality of segments does not include a switch point.

11. The one or more non-transitory computer readable media of claim 10, wherein the first switch point comprises a point in the playback of the first video stream where download of the digital content can be switched from the first video stream to the second video stream or from the second video stream to the first video stream.

12. The one or more non-transitory computer readable media of claim 10, wherein the second switch point comprises a point in the playback of the second video stream where download of the digital content can be switched from the second video stream to the first video stream or from the first video stream to the second video stream.

13. The one or more non-transitory computer readable media of claim 10, further comprising distributing the first segment from a content delivery system to the content player and, subsequently, distributing the second segment from the content delivery system to the content player.

14. The one or more non-transitory computer readable media of claim 10, further comprising retrieving a third sequence header associated with a third video stream storing the digital content encoded at a third playback quality, wherein the third video stream comprises a third plurality of segments that includes a third plurality of switch points.

15. The one or more non-transitory computer readable media of claim 14, wherein a third switch point included in the third plurality of switch points is positioned less than the first temporal distance from the second switch point and is positioned at the first temporal distance from the first switch point and an immediately subsequent switch point in the third video stream.

16. The one or more non-transitory computer readable media of claim 15, wherein the third video stream includes a third segment for playback identified by the third sequence header, wherein the third segment is included in the third plurality of segments and includes the third switch point, and wherein the third segment is played back subsequent to the second segment.

17. The one or more non-transitory computer readable media of claim 10, further comprising determining that the distributing of the at least one of the first video stream or the second video stream to the content player should be switched from the first video stream to the second video stream based on one or more parameters.

18. The one or more non-transitory computer readable media of claim 17, wherein a first parameter included in the one or more parameters comprises a change in network condition.

19. A computer system, comprising:
one or more memories storing instructions; and
one or more processors that are coupled to the one or more memories and,
when executing the instructions, are configured to:
retrieve a first sequence header associated with a first video stream storing digital content encoded at a first playback quality, wherein the first video stream comprises a first plurality of segments that include a first plurality of switch points;
retrieve a second sequence header associated with a second video stream storing the digital content encoded at a second playback quality, wherein the second video stream comprises a second plurality of segments that include a second plurality of switch points; and
distribute at least one of the first video stream or the second video stream to a content player,
wherein the first video stream includes a first segment for playback identified by the first sequence header, wherein the first segment is included in the first plurality of segments and includes a first switch point that is positioned at a first temporal distance from an immediately subsequent switch point in the first video stream, and
wherein the second video stream includes a second segment for playback identified by the second sequence header, wherein the second segment is included in the second plurality of segments and includes a second switch point that is positioned less than the first temporal distance from the first switch point and is positioned at the first temporal distance from an immediately subsequent switch point in the second video stream, wherein a next segment immediately subsequent to the second segment in the second plurality of segments does not include a switch point.

20. The computer system of claim 19, wherein the first switch point comprises a point in the playback of the first video stream where download of the digital content can be switched from the first video stream to the second video stream or from the second video stream to the first video stream.

\* \* \* \* \*